United States Patent
Manwaring et al.

(10) Patent No.: US 7,077,433 B2
(45) Date of Patent: Jul. 18, 2006

(54) THREE STAGE ROTARY STRAP EXTRUDER

(75) Inventors: Marvin V. Manwaring, Clio, MI (US); Lee M. Tinnin, Clio, MI (US); Ravindra Jwalapathy, Saginaw, MI (US); Ray G. Armstrong, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 315 days.

(21) Appl. No.: 10/791,406

(22) Filed: Mar. 2, 2004

(65) Prior Publication Data

US 2005/0194776 A1 Sep. 8, 2005

(51) Int. Cl.
*B62D 1/19* (2006.01)

(52) U.S. Cl. .................................. 280/777; 188/374
(58) Field of Classification Search ............... 280/777; 188/371, 374; 74/492, 493
See application file for complete search history.

(56) References Cited

U.S. PATENT DOCUMENTS

| 5,562,307 | A  | * | 10/1996 | Connor ..................... 280/777 |
| 6,170,874 | B1 |   | 1/2001  | Fosse ....................... 280/777 |
| 6,189,929 | B1 |   | 2/2001  | Struble et al. ............ 280/777 |
| 6,322,103 | B1 |   | 11/2001 | Li et al. ................... 280/777 |
| 6,652,002 | B1 |   | 11/2003 | Li et al. |
| 6,749,221 | B1 | * | 6/2004  | Li ............................ 280/777 |
| 6,802,536 | B1 | * | 10/2004 | Li et al. ................... 280/777 |
| 6,877,775 | B1 | * | 4/2005  | Manwaring et al. ........ 280/777 |

* cited by examiner

*Primary Examiner*—Ruth Ilan
(74) *Attorney, Agent, or Firm*—Michael D. Smith

(57) ABSTRACT

An apparatus and method is provided for absorbing energy in a collapsible steering column. The energy absorbing device includes an anvil rotatable relative to a strap. The anvil defines a plurality of profiles corresponding to different rates of energy absorption. The plurality of profiles are radially adjacent to one another about the rotational axis of the anvil. The anvil can be rotated by explosive charges. For example, the anvil can define a follower portion and first and second explosive charges can be disposed on opposite sides of the follower portion.

9 Claims, 3 Drawing Sheets

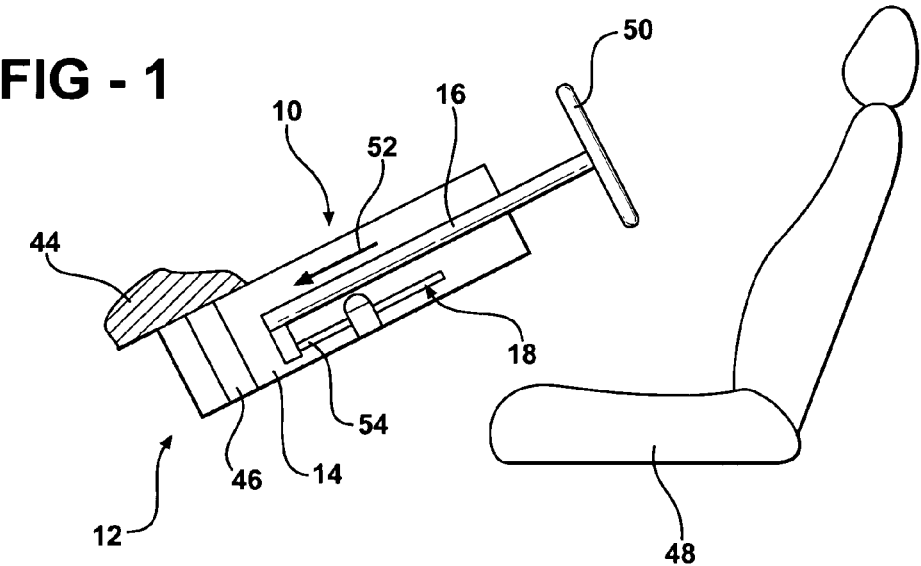
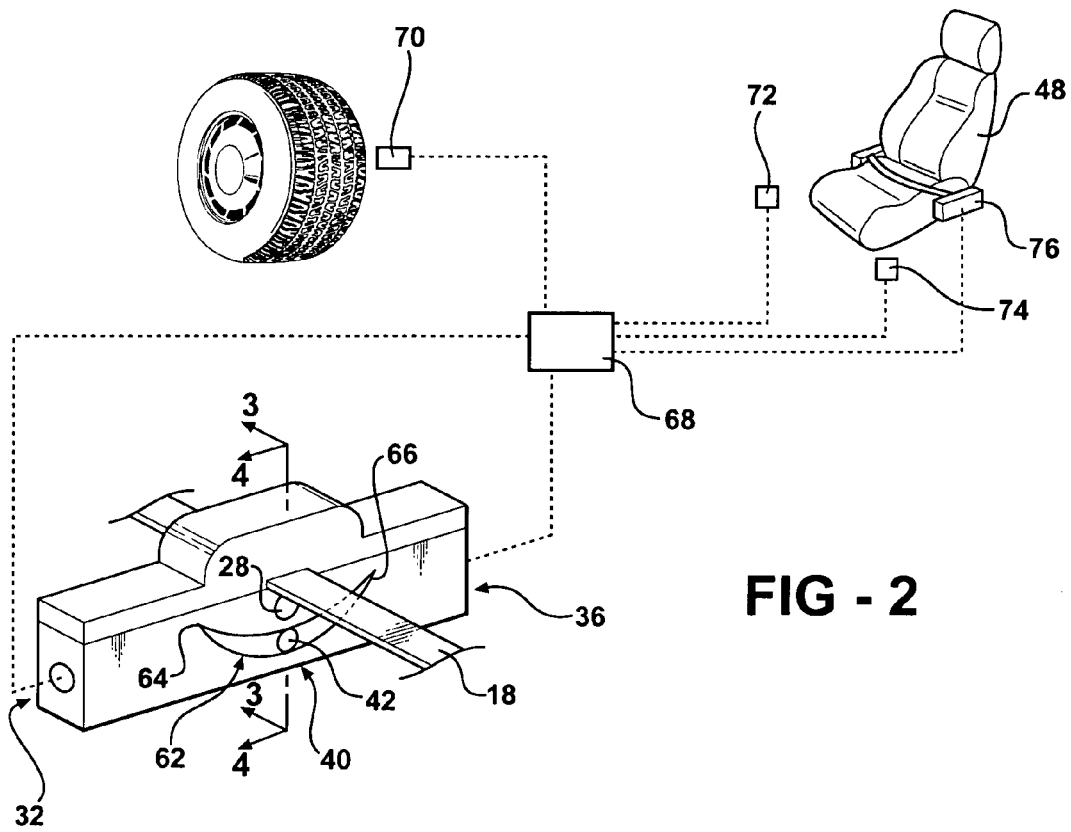

THREE STAGE ROTARY STRAP EXTRUDER

FIELD OF THE INVENTION

The invention relates to a steering column for a vehicle and, more particularly, to an energy absorbing device for a collapsible steering column.

BACKGROUND OF THE INVENTION

Steering column assemblies for vehicles can include kinetic energy absorption devices to reduce the likelihood of injury to the driver in the event of an accident. These energy absorbing devices can come in different forms. In one form, the energy absorbing device includes a metal strap that is bent and drawn over an anvil. Examples of this form of energy absorbing device include U.S. Pat. Nos. 6,170,874; 6,189,929; 6,322,103; and 6,652,002.

SUMMARY OF THE INVENTION AND ADVANTAGES

The present invention provides an energy absorbing device including an anvil having a plurality of different bending profiles radially adjacent to one another about an axis of rotation of the anvil. The different profiles correspond to different levels of energy absorption. The anvil can be rotated to position one of the plurality of profiles adjacent to the strap immediately prior to a collision to selectively set the level of energy absorption. The invention can include a controller for controlling the rotation of the anvil. The controller can determine which profile should be positioned adjacent to the strap based on the size of the driver and/or the severity of the collision to enhance the protection of the driver of the vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic view of a collapsible steering column that includes the exemplary embodiment of the invention;

FIG. 2 is a schematic view of a controller of the exemplary energy absorbing device according to the invention;

DETAILED DESCRIPTION OF THE PREFERRED EMBODIMENT

Figure 3:
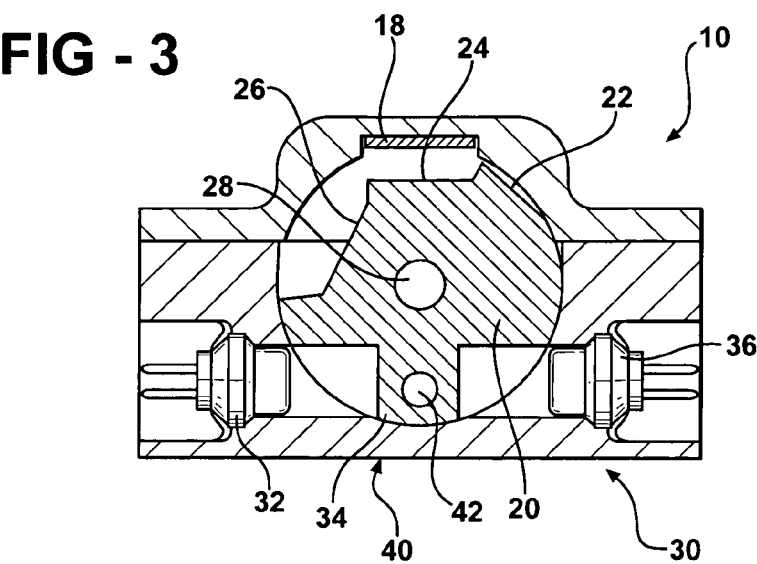
FIG. 3 is a first cross-sectional view taken along section lines 3—3 shown in FIG. 2 and shows an anvil according to the exemplary embodiment of the invention in a first angular position.

Referring now to FIG. 1, the invention provides an energy absorbing device 10 for a collapsible steering column 12 of a vehicle 44. The steering column 12 includes a first steering column member 14 and a second steering column member 16 movable relative to one another in telescoping relation. The first steering column member 14 is fixedly associated with respect to the vehicle 44 with a bracket 46.

In the event of a vehicle crash or impact situation, the first steering column member 14 will decelerate at the same rate as the vehicle 44. A driver of the vehicle 44 may not decelerate at the same rate as the vehicle 44. In such an impact situation, the driver of the vehicle 44 positioned in a seat 48 may be propelled forward against a steering wheel 50 in response to differences between the relative decelerations of the vehicle 44 and the driver.

The steering wheel 50 is connected to the second steering column member 16. In the event of a vehicle crash, the driver may be propelled against the steering wheel 50 and urge both the steering wheel 50 and second steering column member 16 in the direction 52. During movement of the second steering column member 16 in the direction 52, the energy absorbing device 10 substantially absorbs the kinetic energy generated by the movement of the driver against the steering wheel 50 to reduce the likelihood of injury to the driver.

Referring now to FIGS. 1 and 2, the invention also includes a strap 18 operably associated with at least one of the first and second steering column members 14, 16. The strap 18 is movable in response to relative movement between the first and second steering column members 14, 16. In the exemplary embodiment of the invention, a first end 54 of the strap 18 is fixedly associated with the second steering column member 16. As the second steering column member 16 moves in telescoping relation with respect to the first steering column member 14, in the direction 52, the strap 18 also moves in the direction 52. The strap 18 is formed from ductile material such as steel or aluminum.

Referring now to FIGS. 2 and 3, the invention also includes an anvil 20 for variably transmitting an amount of energy associated with collapse of a steering column 12 by defining an axis 28 of rotation and a plurality of different bending profiles 22, 24, 26 radially spaced around the axis 28. Each profile 22, 24, 26 corresponds to a different path length. Generally, the greater the path length, the greater the energy absorption. The strap 18 is drawn over one of the profiles 22, 24, 26 during an impact situation. The exemplary embodiment of the invention includes three profiles 22, 24, 26; however, the invention can be practiced with an anvil having two profiles or having more than three profiles.

The profiles 22, 24, 26 are radially adjacent to one another about an axis 28 of rotation of the anvil 20. The axis 28 is shown in the exemplary embodiment of the invention extending parallel to the strap 18. However, the invention can be practiced wherein the axis 28 of rotation of the anvil 20 extends transverse to the strap 18.

The invention also includes a rotating device 30 for rotating the anvil 20 about the axis 28. In the exemplary embodiment of the invention, the rotating device 30 includes first and second explosive charges 32, 36 for rotating the anvil 20. The anvil 20 defines a follower portion 34 spaced from the axis 28. The first and second explosive charges 32, 36 can be disposed on opposite sides of the follower portion 34. A detonation of the charges 32, 36 act against the follower portion 34.

Figure 4:
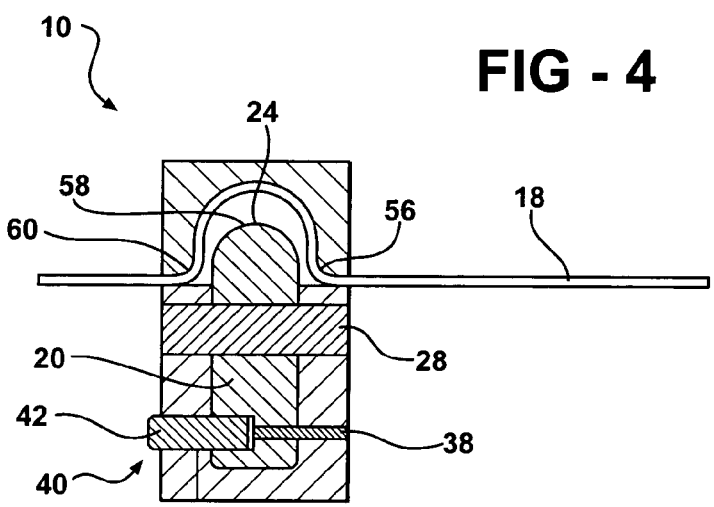
FIG. 4 is a second cross-sectional view taken along section lines 4—4 shown in FIG. 2 and corresponds to the cross-sectional view of FIG. 3, showing the anvil in the first angular position.
Figure 5:
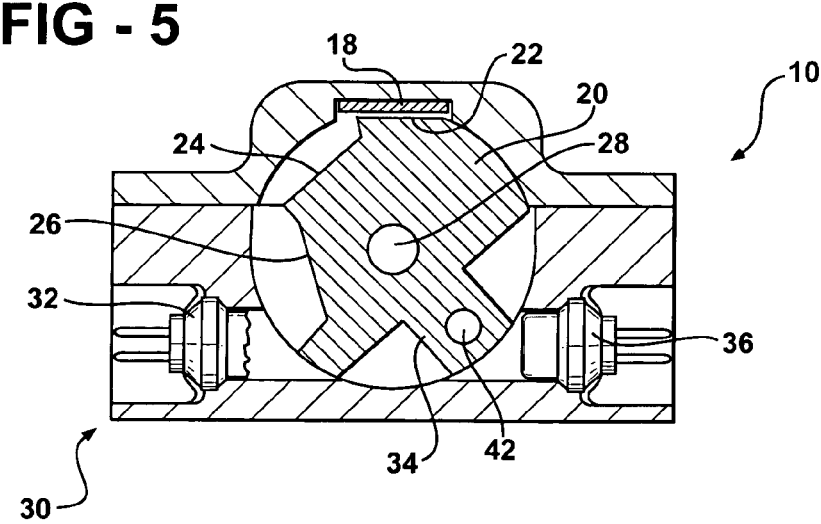
FIG. 5 is a third cross-sectional view taken along similar section lines as FIG. 3 but shows the anvil in a second angular position.
Figure 6:
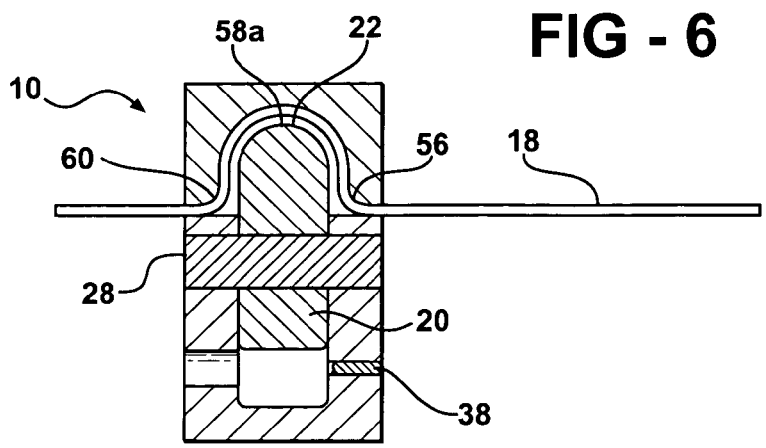
FIG. 6 is a fourth cross-sectional view taken along similar section lines as FIG. 4 but corresponds to the cross-sectional view of FIG. 5, showing the anvil in the second angular position.

FIGS. 3 and 4 show the anvil 20 in a first angular position. The profile 24 is positioned adjacent the strap 18 when the anvil 20 is in the first angular position. The charge 32 can be detonated to rotate the anvil 20 in the counterclockwise direction to the second angular position, as shown in FIGS. 5 and 6. FIG. 5 shows the charge 32 detonated and the anvil 20 rotated such that the profile 22 is adjacent the strap 18. When the anvil 20 is in the second angular position, the strap 18 will follow a longer path of deformation than the path defined by the anvil 20 when the anvil 20 is in the first angular position. For example, as best shown in FIGS. 4 and 6, the strap 18 is plastically deformed around bend points 56, 58 or 58a, and 60. When the anvil 20 is in the second angular position (FIG. 6), the bend point 58a is spaced further from the bend points 56, 60 when compared to the relative distance between the bend points 58 and 56, 60 when the anvil 20 is in the first angular position (FIG. 4).

Figure 7:
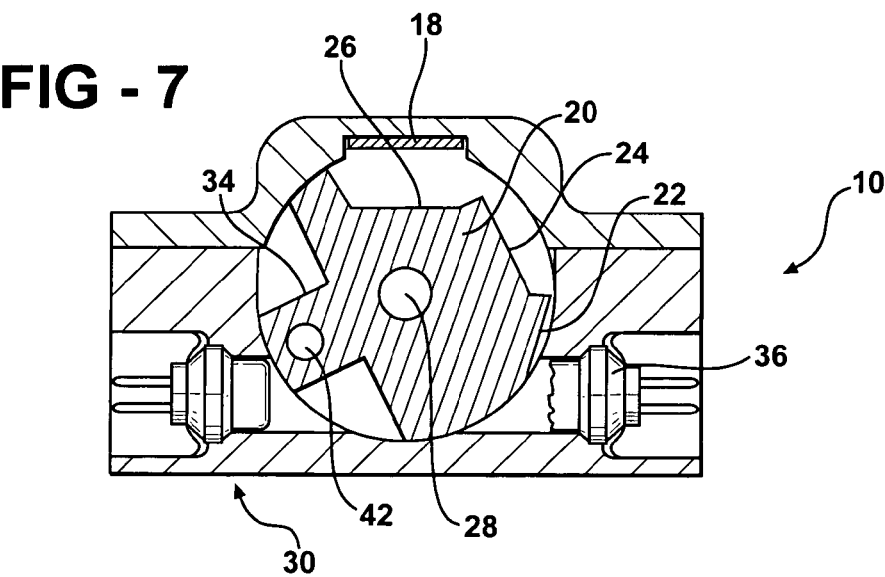
FIG. 7 is a fifth cross-sectional view taken along similar section lines as FIGS. 3 and 5 nut shows the anvil in a third angular position.
Figure 8:
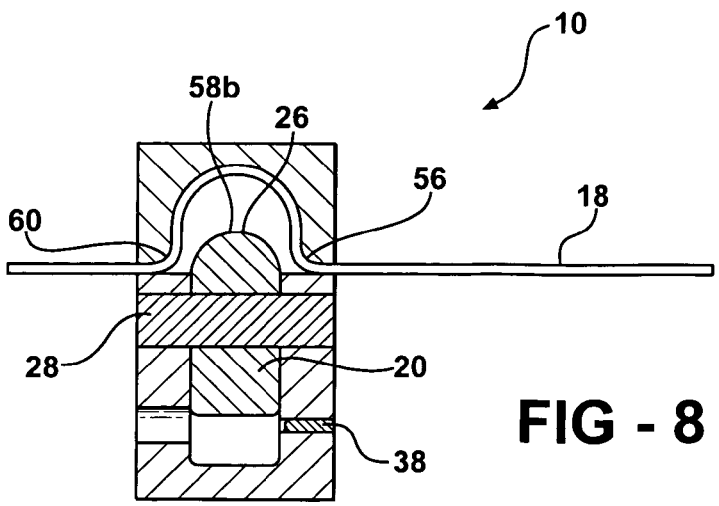
FIG. 8 is a sixth cross-sectional view taken along similar section lines as FIGS. 4 and 6 but corresponds to the cross-sectional view of FIG. 7, showing the anvil in the third angular position.

The charge 36 can be detonated to rotate the anvil 20 in the clockwise direction to the third angular position. The profile 26 is adjacent the strap 18 when the anvil 20 is in the third angular position. FIG. 7 shows the charge 36 in a detonated condition and the anvil 20 rotated to a third angular position. When the anvil 20 is in the third angular position, the strap 18 will follow a shorter path of deformation than the path defined by the anvil 20 when the anvil 20 is in the first angular position. For example, as best shown in FIGS. 4 and 8, the strap 18 is plastically deformed around bend points 56, 58 or 58b, and 60. When the anvil 20 is in the third angular position (FIG. 8), the bend point 58b is spaced further from the bend point 56, 60 when compared to the relative distance between the bend points 58 and 56, 60 when the anvil 20 is in the first angular position (FIG. 4). For clarity, the strap 18 is shown in the drawing figures in the presently preferred pre-collision configuration.

Referring now to FIG. 4, the invention can also include a shear pin 38 for maintaining the anvil 20 in the desired position prior to the detonation of one of the explosive charges 32, 36. The presently preferred position is the first angular position corresponding to the intermediate path length of deformation. The pin 38 is broken in response to the detonation of one of the charges 32, 36.

Referring now to FIGS. 1–3, the invention can also include a braking device 40 for stopping the anvil 20 in a desired position after one of the explosive charges 32, 36 has been detonated. In the exemplary embodiment of the invention, the braking device 40 includes a pin 42 extending from the anvil 20. The pin 42 is positioned in a slot 62 having tapered ends 64, 66. The slot 62 can be sized slightly larger than the diameter of the pin 42 at a position corresponding to the first angular position of the anvil 20, as shown in FIG. 2. The diameter of the slot 62 can taper at the ends 64, 66 to increase the likelihood that the pin 42 will become wedged in the slot 62 when the anvil is moved to one of the second and third angular positions.

The rotation of the anvil 20 is controlled by a controller 68. The controller 68 communicates with a plurality of sensors 70, 72, 74, 76 and with charges 32, 36 to selectively rotate the anvil 20. In the exemplary embodiment of the invention, the sensor 70 is a vehicle speed sensor, the sensor 72 is driver-to-steering wheel proximity sensor, the sensor 74 is a driver-weight sensor, and the sensor 76 is a seat belt engagement sensor. Each of the conditions sensed by the sensors 70, 72, 74, 76 can effect the energy associated with the driver of the vehicle 44 being propelled against the steering wheel 50.

For example, greater vehicle speed generally corresponds to greater energy. If the vehicle 44 is traveling at a high rate of speed, the driver may be propelled with greater force against the steering wheel 50 than in a low-speed impact situation. In response to greater vehicle speed in an impact situation, the controller 68 can detonate the charge 32 to move the profile 22 adjacent the strap 18 and absorb more energy.

In addition, the closer the driver of the vehicle 44 is to the steering wheel 50, the greater the likely force that the driver will exert on the steering wheel 50. In response to the driver being positioned relatively close to the steering wheel 50, the controller 68 can detonate the charge 32 to move the profile 22 adjacent the strap 18 and absorb more energy. Also, the greater the weight of the driver, the greater the likely force that the driver will exert on the steering wheel 50. In response to greater driver weight, the controller 68 can detonate the charge 32 to move the profile 22 adjacent the strap 18 and absorb more energy. Also, the driver is likely to exert greater force on the steering wheel 50 in an impact situation if the driver is not wearing a seat belt. In response to disengagement of the driver's seat belt in an impact situation, the controller 68 can detonate the charge 32 to move the profile 22 adjacent the strap 18 and absorb more energy.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for absorbing energy in a collapsible steering column of a vehicle in response to an excessive frontal impacting force to the steering column so that injury to the vehicle operator is reduced comprising:
   an anvil for variably transmitting an amount of energy associated with collapse of a steering column by defining an axis of rotation and a plurality of different bending profiles radially spaced around said axis;
   a strap for absorbing energy transmitted by said anvil by being deformable during sliding movement across one of said profiles; and
   a rotating device for adjusting an amount of energy absorbed by said strap by rotating said anvil about said axis to selectively position one of said bending profiles adjacent to said strap to adjust a rate of deformation of said strap.

2. The apparatus of claim 1 wherein said anvil is further defined as including a follower portion engageable with said rotating device to rotate said anvil.

3. The apparatus of claim 2 wherein said rotating device is further defined as including an explosive charge.

4. The apparatus of claim 3 wherein said explosive charge is further defined as including first and second explosive charges disposed on opposite sides of said follower portion and said anvil being rotatable in a first direction in response to an explosion of said first explosive charge and rotatable in a second direction in response to an explosion of said second explosive charge.

5. The apparatus of claim 4 including a braking device for stopping said anvil in a desired position after one of said first and second explosion charges has exploded.

6. The apparatus of claim 5 wherein said braking device is further defined as including a pin extending from said anvil.

7. The apparatus of claim 6 including a shear pin for maintaining said anvil in a desired position prior to an explosion of one of said first and second explosion charges.

8. The apparatus of claim 7 wherein said pin is further defined as extending parallel to said axis.

9. The apparatus of claim 1 wherein said axis is further defined as extending parallel to said strap.

* * * * *